United States Patent
Oomura et al.

(10) Patent No.: US 6,504,955 B2
(45) Date of Patent: *Jan. 7, 2003

(54) INFORMATION PROCESSING APPARATUS, INFORMATION PROCESSING METHOD, STORAGE MEDIUM, AND PRINTING SYSTEM

(75) Inventors: Hiroshi Oomura, Yokohama (JP); Akihiro Shimura, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/144,494

(22) Filed: Aug. 31, 1998

(65) Prior Publication Data

US 2002/0018593 A1 Feb. 14, 2002

(30) Foreign Application Priority Data

Sep. 3, 1997 (JP) .............................................. 9-238577
Sep. 11, 1997 (JP) .............................................. 9-246756
Jul. 23, 1998 (JP) ........................................... 10-208036

(51) Int. Cl.[7] ........................... G06K 9/34; G06K 9/48; G06K 9/68
(52) U.S. Cl. ...................... 382/173; 382/174; 382/178; 382/199; 382/226
(58) Field of Search ................................ 382/170, 171, 382/172, 173, 174, 175, 176, 135, 317, 177, 178, 179, 180, 190, 194, 199, 226, 256; 395/143, 144, 145, 163, 164, 788

(56) References Cited

U.S. PATENT DOCUMENTS

| | | | | |
|---|---|---|---|---|
| 4,907,282 A | * | 3/1990 | Daly et al. ...................... 382/9 |
| 5,075,875 A | | 12/1991 | Love et al. ................... 395/117 |
| 5,241,625 A | * | 8/1993 | Epard et al. ................. 395/163 |
| 5,333,249 A | * | 7/1994 | Klassen ....................... 395/143 |
| 5,515,451 A | * | 5/1996 | Tsuji et al. .................. 382/135 |
| 5,666,543 A | * | 9/1997 | Gartland ...................... 395/788 |
| 5,680,479 A | * | 10/1997 | Wang et al. .................. 382/176 |
| 5,825,993 A | * | 10/1998 | Shimura et al. ............. 395/115 |
| 5,838,342 A | * | 11/1998 | Takahashi et al. ............. 347/19 |
| 5,887,088 A | * | 3/1999 | Kurokawa et al. ........... 382/317 |
| 6,081,616 A | * | 6/2000 | Vaezi et al. .................. 382/171 |

FOREIGN PATENT DOCUMENTS

| | | |
|---|---|---|
| EP | 0 427 466 | 5/1991 |
| EP | 0 432 896 | 6/1991 |
| EP | 537029 | 4/1993 |

\* cited by examiner

*Primary Examiner*—Phuoc Tran
*Assistant Examiner*—Amir Alavi
(74) *Attorney, Agent, or Firm*—Fitzpatrick, Cella, Harper & Scinto

(57) ABSTRACT

It is an object to print an image as it is inherently formed. Objects constructing the image are separated to character train objects in which there is no need to consider an overlap and the other objects by a character train separator. A character train converter converts the separated character train objects in which there is no need to consider the overlap into character code information and transmits to a printer. The other objects are converted into image information by a drawer and transmitted to the printer. The printer synthesizes a glyph formed by a glyph generator from the character code information onto the received image information and outputs.

36 Claims, 14 Drawing Sheets

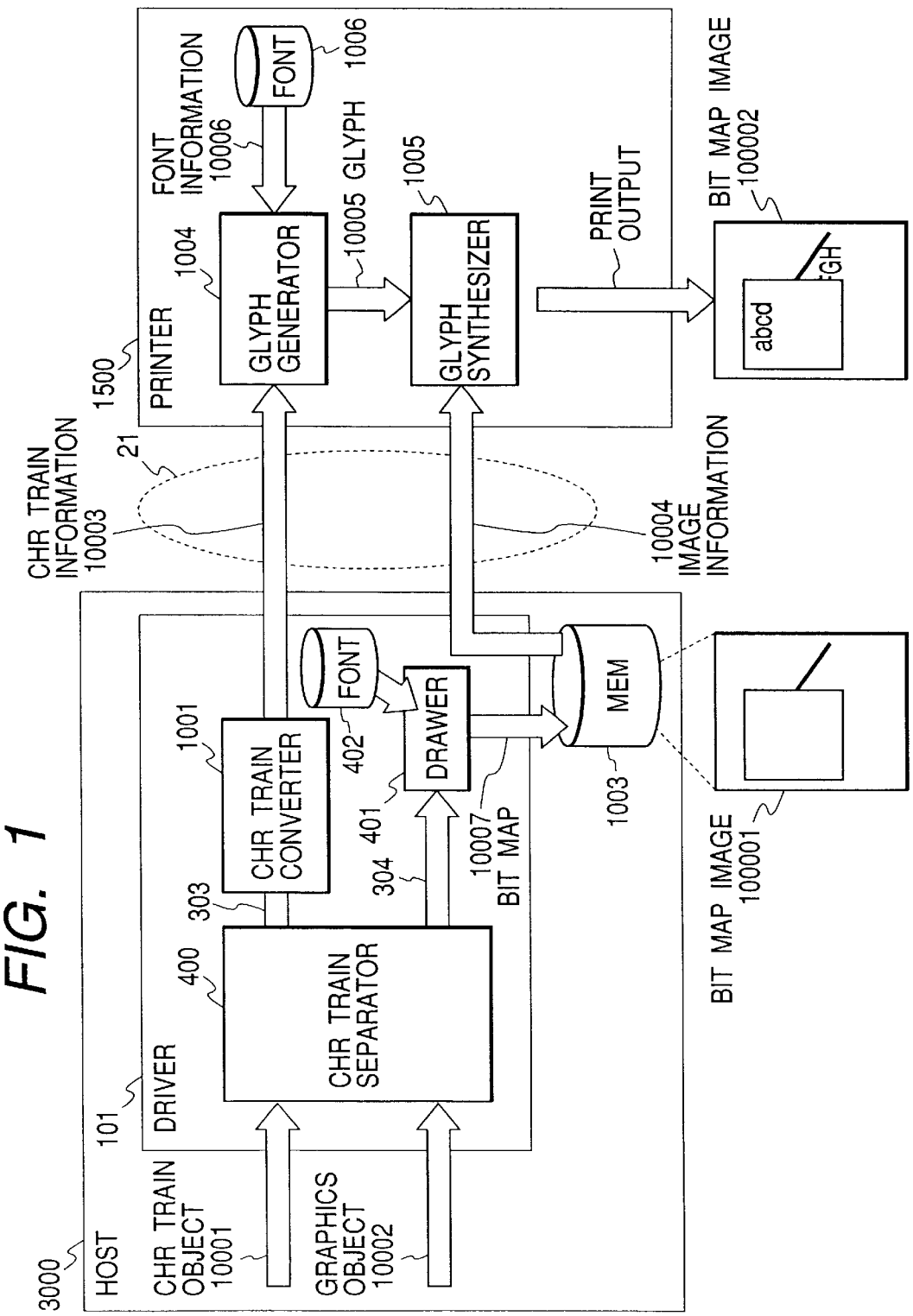

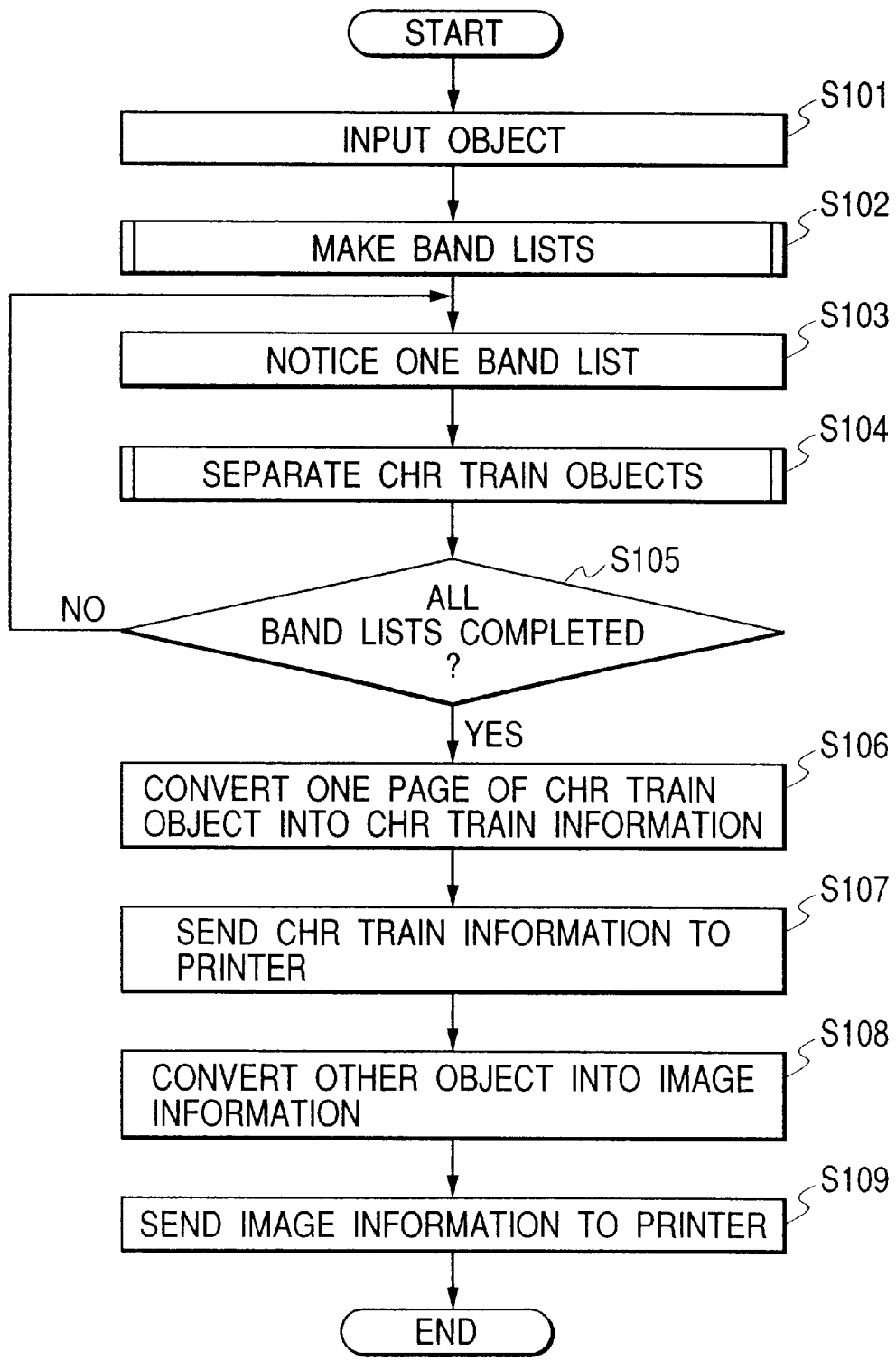

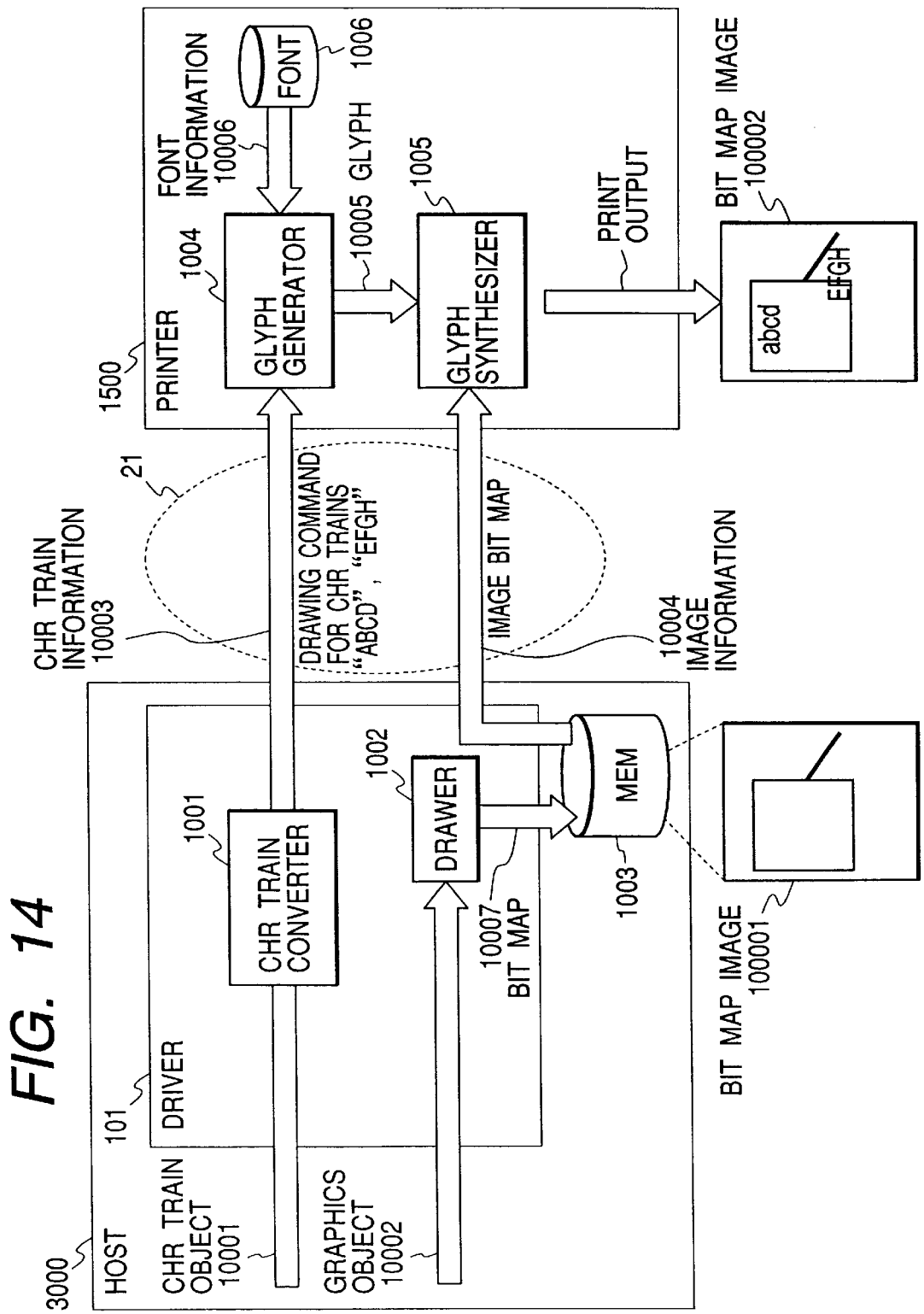

INFORMATION PROCESSING APPARATUS, INFORMATION PROCESSING METHOD, STORAGE MEDIUM, AND PRINTING SYSTEM

BACKGROUND OF THE INVENTION

1. Field of the Invention

The invention relates to an information processing apparatus, an information processing method, a storage medium, and a printing system for transmitting print data to a printer and allowing the print data to be printed by the printer.

2. Related Background Art

Among the conventional printing systems, there is a printing system for processing a character train object by a method different from that of a graphics object and transferring the processed object to a printer.

FIG. 14 is a diagram showing an example of a printing system (hereinafter, simply referred to as a system) according to the conventional method.

<Description of Outline of System>

As shown in FIG. 14, a host computer (hereinafter, simply referred to as a host) 3000 and a printer 1500 are connected through some communication interface 21 such as a centronics or the like. A character train object 10001 is transferred as character train information 10003 to the printer 1500. A graphics object 10002 is transferred as image bit map data serving as image information 10004 to the printer 1500.

<Transferring Method which is Changed in Accordance with the Kind of Drawing Object>

In the above system, a case where only the character train object 10001 is printed as a drawing object of one page of a recording paper will now be considered.

In case of the general printing of only characters, an amount of data in which the character train objects of one page were developed in an image bit map is larger than a data amount of character train code information. Therefore, a transfer data amount can be more suppressed by the method of transferring the character train objects as character train code information to the printer rather than the method of developing all of the drawing objects to bit map image data and transferring the bit map image data from the host to the printer. Therefore, the transferring method is changed in accordance with the kind of drawing object, thereby realizing a high efficiency of the data transfer.

<Description of Processes Time from Data Input to Data Output>

According to the above system, one of subsystems which operate by the host 3000, for example, a document processing subsystem inputs the character train object 10001 as a drawing object or the graphics object 10002 to a driver 101 which operates in the host 3000, so that the processes are started.

The driver 101 to which the drawing object has been inputted executes the following processes in accordance with the kind of input drawing object until the input of the drawing objects of one page of the recording paper is finished.

(1) When the character train object 10001 is inputted, the driver 101 converts the character train object into character train code information by using a character train converter 1001 and transfers the converted information as character train information 10003 to the printer 1500.

(2) When the graphics object 10002 is inputted, the input object is once developed as a bit map image 100001 into a memory 1003 serving as a virtual output medium by using a drawer 1002. In this instance, no character information is included in the bit map image 100001. When the drawing objects of one page of the recording paper are inputted, the bit map image 100001 drawn so far is transferred as image information 10004 to the printer 1500.

When all of the drawing objects of one page of the recording paper are processed by the driver, the character train information 10003 corresponding to the character train objects 10001 of one page of the recording paper and/or the image information 10004 in which the graphics objects 10002 of one page of the recording paper were developed has been inputted in the printer 1500.

The printer 1500 executes the following processes.

(1) A glyph generator 1004 develops the input character train information 10003 into bit map information 10005 (Glyph) of a character train by using font information 10006 stored in a built-in font memory (FONT) 1006.

(2) A glyph synthesizer 1005 overwrites the developed glyph information 10005 onto the bit map image as image information 10004 of one page of the recording paper.

A bit map image 100002 which is obtained as a result of the above processes becomes a print result.

<Specification that is Common to the Conventional Art>

In the system mentioned in the above example, it is assumed that a possibility in which the other drawing objects are overlapped on the character train object is low so long as a general printed matter is printed. A drawing order of the character train is ignored. For example, a similar specification is also used in a case of annexed UniDriver as a general driver of MS-Windows as a typical operating system which is installed in the host. By using such a specification, the following advantages can be obtained.

(1) While the driver develops the graphics object into the bit map image, by developing the character train object into the glyph information in the printer driver, the printing time can be reduced.

(2) In the case where the drawing objects of one page of the recording paper are constructed by only the character train objects, there is no need to transfer the bit map image, so that a transfer data amount between the host and the printer is reduced.

However, in the system, information of the drawing order in the character train objects is consequently lost.

FIG. 2A shows an example of an image obtained by overlaying a character train 202 ("ABCD") onto a rectangle fill 201, namely, an image obtained by drawing the character train 202 after the rectangle fill 201. FIG. 2B shows an example of an image obtained by overlaying a character train 204 under a rectangle fill 203, namely, an image obtained by drawing the character train 204 before the rectangle fill 203. As mentioned above, even in the image in which the same object is arranged at the same position in the picture plane, the output results are different depending on a difference of the drawing order. From this reason, in case of the conventional printing system for performing processes while ignoring the drawing order, there exists a case where the character train objects in the printer are drawn in accordance with the drawing order different from the order which the user inherently wants to draw, so that the inherent print result and the print result actually obtained remarkably differ.

As a simplest method to solve the above problem, there is considered a method of drawing all of the drawing objects into a bit map image on the driver 101 side in accordance with the drawing order without distinguishing the character train objects from the other drawing objects. However, if the printing is performed by this method, even when the drawing objects of one page constructed by only the character train objects are outputted, it is necessary to transfer all of the objects to the printer by the bit map image and the formation of all of the bit map images has to be performed by the host apparatus. In other words, all of the advantages obtained in the apparatus of FIG. 14 are lost.

SUMMARY OF THE INVENTION

The invention is made in consideration of the above conventional techniques and it is an object of the invention to make it possible to print by a printer on the basis of a designated drawing result. Another object of the invention is that an overlap of character train objects and drawing objects is discriminated from attribute information and space information, and with respect to the character train objects which do not need to consider an overlap, by transmitting them as character train information to a printer, an amount of data to be transmitted is reduced, and by developing an image in parallel with the printer, a processing efficiency is improved, and an overlap extent of the drawing objects is preserved and the drawing objects are outputted from the printer as an inherent image to be formed.

Still another object of the invention is to prevent a situation such that since a time limitation and a limitation of the number of times are provided for the overlap space discrimination, long time is consumed for the purpose of discrimination.

According to the invention, there is provided an information processing apparatus comprising:

discriminating means for discriminating whether objects are drawing objects to be drawn in consideration of a drawing order or not; and transfer means for, when it is determined by the discriminating means that the objects are the drawing objects to be drawn in consideration of the drawing order, forming image data corresponding to the drawing objects and transferring formed image data as print data to a printer and for, when it is decided by the discriminating means that the objects are the drawing objects in which there is no need to draw in consideration of the drawing order, forming code data corresponding to the drawing objects and transferring formed code data as print data to the printer.

According to the invention, there is also provided an information processing method comprising:

a discriminating step of discriminating whether objects are drawing objects to be drawn in consideration of a drawing order or not; and a transfer step of, when it is determined by the discriminating step that the objects are the drawing objects to be drawn in consideration of the drawing order, forming image data corresponding to the drawing objects and transferring formed image data as print data to a printer and, when it is decided by the discriminating step that the objects are the drawing objects in which there is no need to draw in consideration of the drawing order, forming code data corresponding to the drawing objects and transferring formed code data as print data to the printer.

According to the invention, there is provided a storage medium for storing programs comprising:

a discriminating step of discriminating whether objects are drawing objects to be drawn in consideration of a drawing order or not; and a transfer step of, when it is determined by the discriminating step that the objects are the drawing objects to be drawn in consideration of the drawing order, forming image data corresponding to the drawing objects and transferring formed image data as print data to a printer and, when it is decided by the discriminating step that the objects are the drawing objects in which there is no need to draw in consideration of the drawing order, forming code data corresponding to the drawing objects and transferring formed code data as print data to the printer.

According to the invention, there is provided a printing system comprising:

an information processing apparatus having discriminating means for discriminating whether objects are drawing objects to be drawn in consideration of a drawing order or not and transfer means for, when it is determined by the discriminating means that the objects are the drawing objects to be drawn in consideration of the drawing order, forming image data corresponding to the drawing objects and transferring formed image data as print data to a printer and for, when it is decided by the discriminating means that the objects are the drawing objects in which there is no need to draw in consideration of the drawing order, forming code data corresponding to the drawing objects and transferring formed code data as print data to the printer; and the printer for forming image data corresponding to the code data which is transferred from the information processing apparatus, synthesizing formed image data and image data to be transferred, and printing synthesized image data.

BRIEF DESCRIPTION OF THE DRAWINGS

FIG. 1 is a block diagram of a printing system of an embodiment;

FIG. 13 is a flowchart for a procedure to form character train information or image information from each drawing object; and FIG. 14 is a block diagram of a conventional printing system.

DETAILED DESCRIPTION OF THE PREFERRED EMBODIMENTS

Figure 2A:
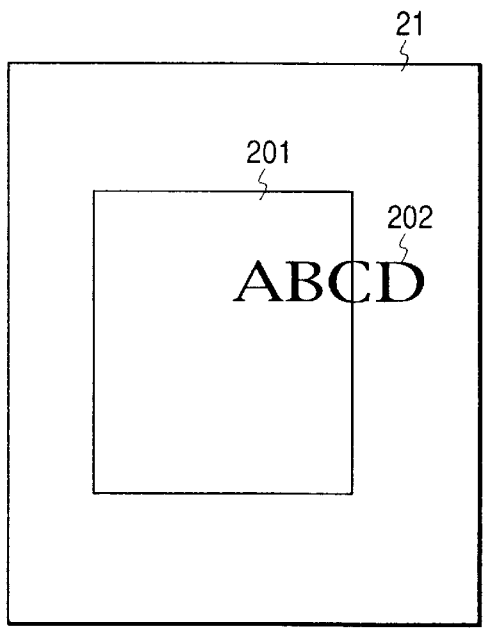
FIGS. 2A and 2B are diagrams showing a difference of output results due to a drawing order.

FIG. 1 shows a construction of a printing system according to an embodiment of the invention.

<Construction and Operation of a Printing System>

In FIG. 1, in the host 3000, various application programs (not shown) operate and drawing objects such as character trains, graphics, or the like as necessary in order to print are outputted and are inputted to the printer driver 101, which will be explained hereinlater.

The "drawing object" used here denotes a concept of an abstracted drawing command such as character train, line, rectangle, polygon, bit map, image, or the like which is transferred from a system such as an OS or the like on the host to the printer. In particular, a drawing object indicative of a drawing of a character train is classified and called a character train object and a drawing object regarding a drawing of the other drawing objects is classified and called a graphics object. "Character train information" assumes information showing a printing of a character train including character codes or the like which are transferred from the host to the printer. "Image information" assumes information such as an image map or the like which is transferred from the host to the printer in order to show a printing of graphics.

The host 3000 and printer 1500 are coupled by some communication medium 21 such as a centronics or the like. The character train object 10001 is transferred as character train information 10003 including character codes, printing positions, and the like to the printer 1500. The graphics object 10002 is transferred as image information 10004 including the bit map image to the printer 1500.

The printer driver 101 to which the drawing object is inputted from an application program or the like executes the following processes until the input of drawing objects of one page is finished in dependence on the kind of inputted drawing object.

(1) When the drawing objects (character train object 10001 and graphics object 10002) are inputted, for the character train objects in one page, the drawing objects inputted after that are discriminated and the character train objects on which the other objects do not overlap or the character train objects in which there is no need to consider an overlap are separated as non-order character train objects from the other drawing objects by a character train separator 400.

(2) The separated non-order character train objects are converted into character train information by the character train converter 1001 and is transferred as character train information 10003 to the printer 1500 at any time.

(3) The bit map image 100001 is developed by a drawer 401 from the drawing objects other than the non-order character train objects. In this instance, the character train objects are developed into a bit map image by using a font file 402. The developed bit map image is transferred as image information 10004 to the printer 1500 side.

On the other hand, the printer 1500 executes the following processes.

(1) From the inputted character train information 10003, the glyph information 10005 (bit map information of the character train) is developed by the glyph generator 1004 by using the font information 10006 in which the built-in font 1006 has been stored.

(2) The developed glyph information 10005 is overwritten by the glyph synthesizer 1005 onto the bit map image 100001 in which all of the graphics objects 10002 of one page have been developed.

In the embodiment, the driver 101 comprises the character train separator 400, the drawer 401 for converting the graphics objects 10002 and character train objects 10001 into the bit map image, and the font file 402 for supplying font information to the drawer 401 in addition to the conventional construction. First, the character train separator 400 will be described in detail.

<Construction of the Character Train Separator>

The character train separator is constructed by the following two discriminators.

1) Attribute Discriminator

A discriminator to realize that in the case where even if a drawing is performed to a set of drawing objects corresponding to a predetermined region without considering the drawing order, it is not influenced, the character train objects in the set are transferred as character train information, and if it is influenced, the character train objects are transferred as image information. The discriminator examines drawing data in each of regions obtained by dividing a region corresponding to one page of the recording paper into a plurality of logic regions and extracts only the character train objects in the region which satisfies the following conditions.

Case where only the character trains of the same color exist in the region

Case where only the drawing objects which do not exert an influence on the drawing result even if the drawing order is slightly changed exist, namely, the case where all of the character train objects and the graphics objects in the region show the same color and, for example, any special raster operations other than the overwriting and the OR are not applied.

2) Space Discriminator

To discriminate that no drawing object is overlaid on the character train objects in one page, for each of the character train objects in one page, all of the overlaps with the drawing objects inputted after that have to be discriminated. It is necessary to perform the discrimination of the number of times on the order of the square of the number of drawing objects. The space discriminator, therefore, has the following two features.

(1) One page is divided into a plurality of regions and the foregoing overlap discrimination is executed to the drawing objects included in the region.

(2) When the time that is required for discrimination exceeds a predetermined limit time/the number of times, the discrimination is stopped and all of the character train objects are outputted as image information.

In case of the embodiment, the character train objects which are not influenced by the drawing order are extracted by the attribute discriminator in a form such that the space discriminator is applied to the character train objects which cannot be extracted.

Figure 3:
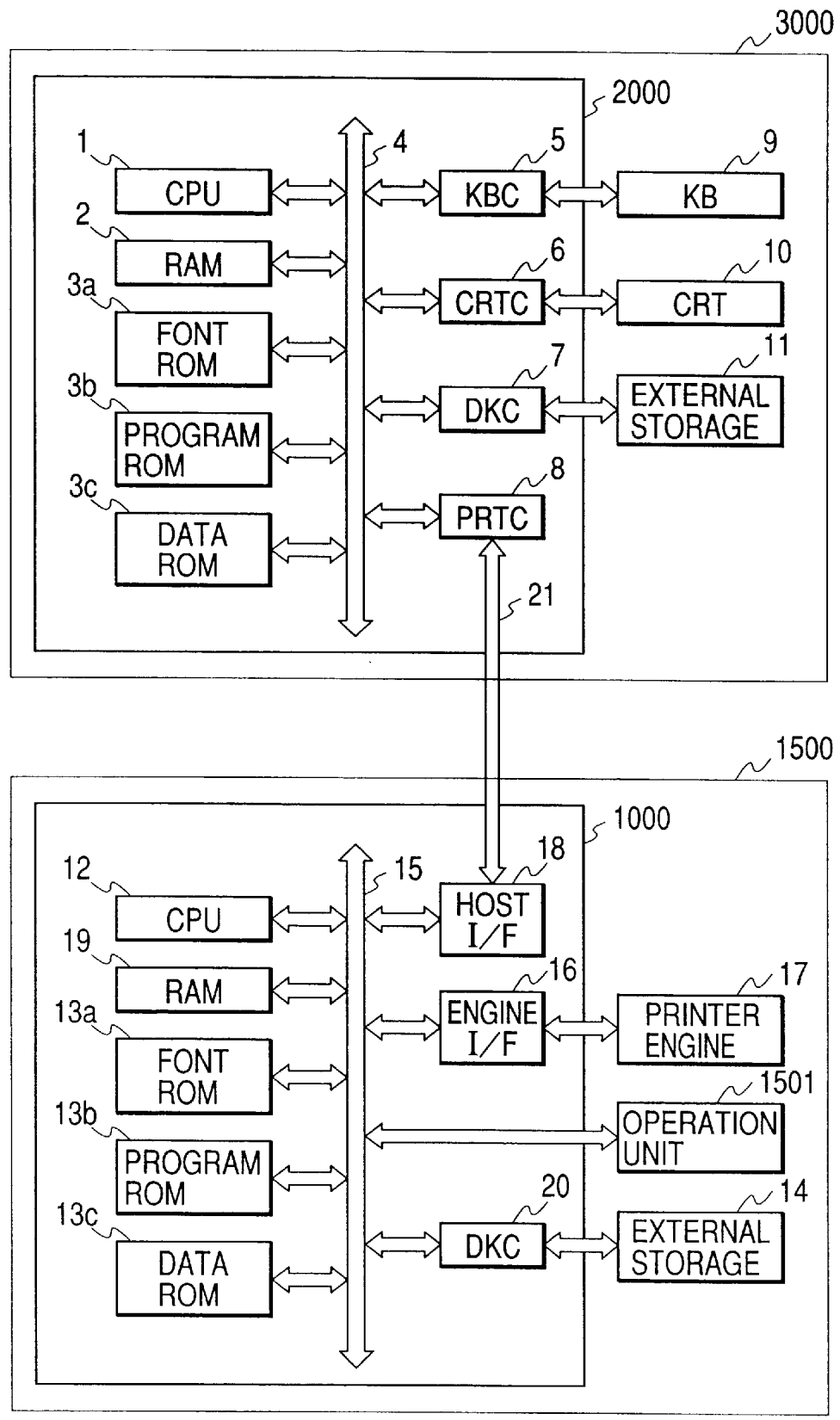
FIG. 3 is a block diagram showing a construction of a printing system comprising a host 3000, a printer 1500, and a bidirectional interface 21 for mutually connecting them.

FIG. 3 is a block diagram showing a construction of a system constructed by the host 3000, printer 1500, and bidirectional interface (hereinafter, simply referred to as a bidirectional I/F) 21 for mutually connecting them.

The host 3000 comprises: a main unit 2000; and peripheral equipment such as keyboard (KB) 9, CRT display (CRT) 10, external storage 11 such as hard disk (HD), floppy disk (FD), or the like to store a boot program, various applications, font data, user file, edition file, etc., and the like.

In the main unit 2000, the CPU 1 integratedly controls each element connected to a system bus 4 constructing the main unit 2000 and executes a process of a document in which figures, images, characters, tables (including a spreadsheet), and the like mixedly exist on the basis of a document processing program or the like stored in a program ROM 3b. A control program including a program regarding a flowchart which is executed by the CPU 1 and will be explained hereinlater or the like is stored in the program ROM 3b as well as the document processing program. Font data which is used at the time of the document process and the like are stored in a font ROM 3a. Various constant data which is used when the document process or the like is executed is stored in a data ROM 3c.

Reference numeral 2 denotes an RAM which is used as a work area when the CPU 1 executes various processes and control; 5 a keyboard controller (KBC) to control a key input from the keyboard (KB) 9 or a pointing device (not shown); 6 a CRT controller (CRTC) for controlling a display of the CRT display (CRT) 10; 7 a disk controller (DKC) for controlling an access to the external storage 11; and 8 a printer controller (PRTC) for connecting the printer 1500 through the bidirectional I/F 21 and executing a communication control process with the printer 1500.

Reference numeral 4 denotes the CPU bus for mutually connecting the above component elements.

The printer 1500 is constructed by a controller 1000, a printer engine (hereinafter, referred to as an engine) 17, an external storage 14, and an operation unit (operation panel) 1501.

In the controller 1000, a CPU 12 integratedly controls accesses to various devices which are connected to a system bus 15 on the basis of the control program or the like stored in the program ROM 13b or the control program or the like stored in the external storage 14 and generates an image signal to the engine 17 which is connected through an engine interface (hereinafter, referred to as an engine I/F) 16. Further, the CPU 12 can communicate with the host 3000 through a host interface (hereinafter, referred to as a host I/F) 18 and can notify the host 3000 of information or the like in the printer 1500.

A control program or the like which is executed by the CPU 12, which will be explained hereinlater, is stored in the program ROM 13b. Font data or the like which is used when the CPU 12 generates image information is stored in the font ROM 13a. In case of a printer without the external storage 14 such as a hard disk (HD) or the like, information or the like which is used on the host 3000 has been stored in the data ROM 13c.

An RAM 19 is used as a work area when the CPU 12 executes the control program and can expand a memory capacity by an option RAM which is enclosed in an expansion port (not shown). An image information developing area, an environment data storing area, an area which is used in an NVRAM, an accumulating area to compress and store data, and the like are provided in the RAM 19. The hard disk (HD), IC card, or the like is access controlled as an external storage 14 by a disk controller (DKC) 20. The external storage 14 is connected as an option and stores font data, an emulation program, form data, and the like. Switches for a user operation, an LED or an LCD, and the like are arranged on the operation panel 1501.

Figure 4:
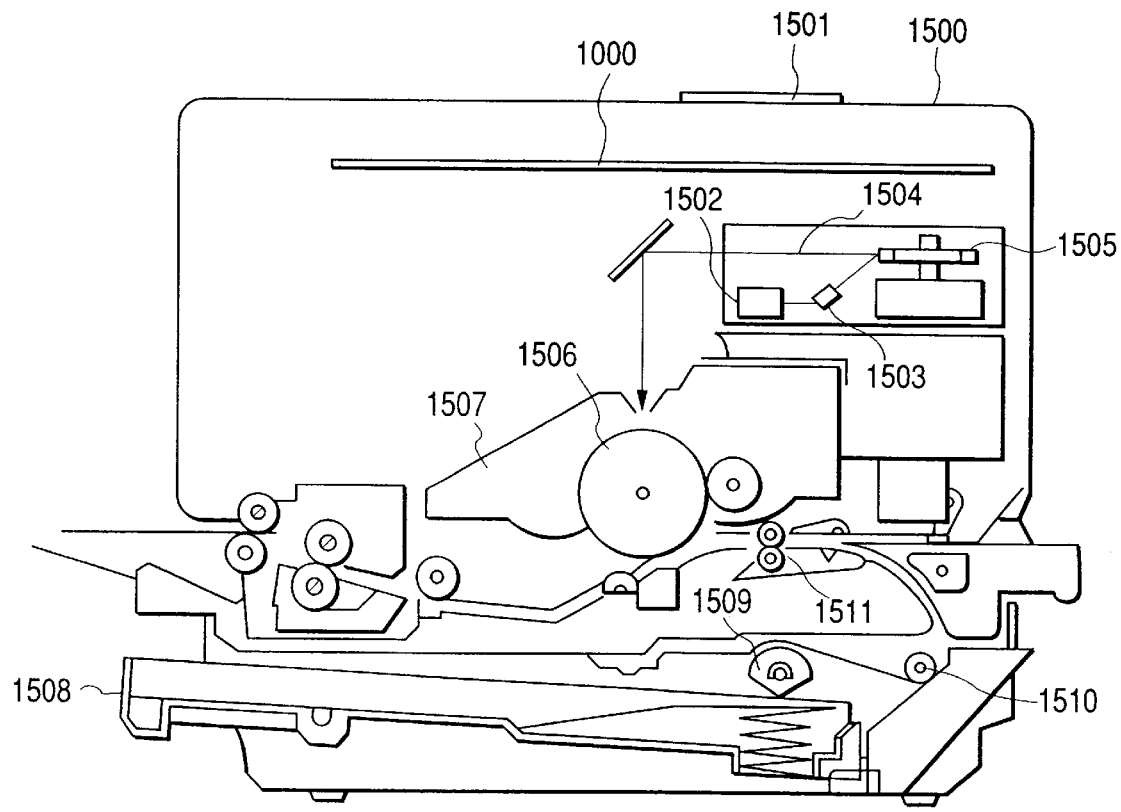
FIG. 4 is a side sectional view showing an internal structure of a printer including a printer engine 17 for recording by using an electrophotographic system.

FIG. 4 is a side sectional view showing an internal structure of a printer including the printer engine 17 to record by using the electrophotographic system.

Figure 2B:
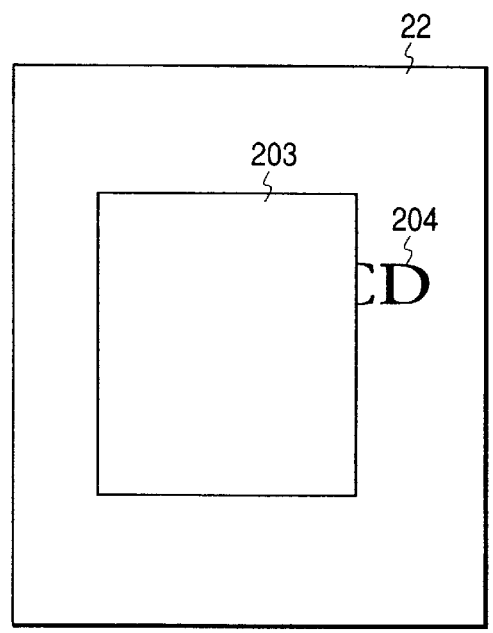

In FIG. 4, reference numeral 1500 denotes the laser beam printer (LBP) for forming an image onto a recording paper serving as a recording medium on the basis of a character pattern or the like which is supplied. Reference numeral 1501 denotes the operation panel in which the switches for the operation, an LED display, and the like are arranged. Reference numeral 1000 denotes the controller for performing a control of the whole LBP 1500 and analyzing the character pattern information or the like. In the block diagram of FIG. 2, portions except for the engine 17, operation panel 1501, and external storage 14 are included in the controller 1000.

A laser driver 1502 is a circuit to drive a semiconductor laser 1503 and on/off switches a laser beam 1504 which is emitted from the semiconductor laser 1503 in accordance with an inputted video signal. The laser beam 1504 is swung to the right and left by a rotary polygon mirror 1505 and scans on an electrostatic drum 1506. Thus, an electrostatic latent image of a character pattern is formed on the electrostatic drum 1506. The latent image is developed by a developing unit 1507 around the electrostatic drum 1506 and, after that, it is transferred onto the recording paper. Cut sheets are used as recording papers. The cut sheet recording papers are enclosed in a sheet cassette 1508 set in the LBP 1500 and are fed one by one into the apparatus by a feed roller 1509 and conveying rollers 1510 and 1511 and supplied to the electrostatic drum 1506. The LBP 1500 has at least one or more card slots (not shown) and is constructed such that an option font card and a control card (emulation card) of a different language can be connected to the LBP in addition to the built-in font.

The given print data is recorded and outputted onto the paper as mentioned above.

The printer to which the embodiment can be applied is not limited to the laser beam printer but a printer of another printing system, for example, an ink jet system can be also used.

Figure 5:
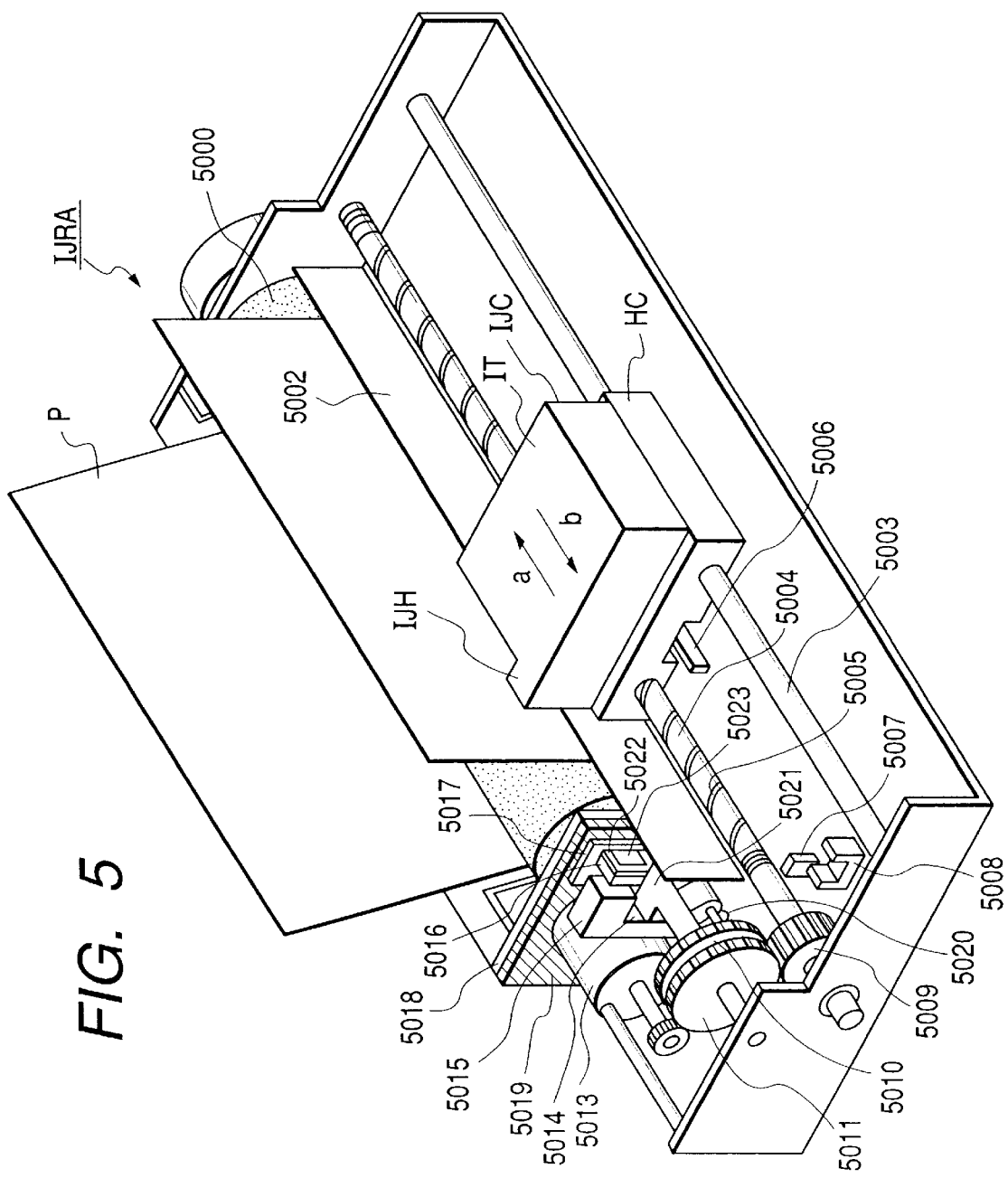
FIG. 5 is an external perspective view showing an outline of a construction of an ink jet printer IJRA.

FIG. 5 is an external perspective view showing an outline of a construction of an ink jet printer IJRA. In FIG. 5, a carriage HC which is come into engagement with a spiral groove 5004 of a lead screw 5005 which is rotated through driving force transfer gears 5009 to 5011 in association with the forward/reverse rotation of a driving motor 5013 has a pin (not shown). The carriage HC is supported by a guide rail 5003 and is reciprocated in the directions shown by arrows a and b. An integrated type ink jet cartridge IJC having therein a recording head IJH and an ink tank IT is mounted on the carriage HC. Reference numeral 5002 denotes a paper pressing plate for pressing a recording paper P in the moving direction of the carriage HC toward a platen 5000. Reference numerals 5007 and 5008 denote photocouplers serving as home position detectors for confirming the existence of a lever 5006 of the carriage in a region corresponding to each photocoupler and executing a switching or the like of the rotating direction of the motor 5013. Reference numeral 5016 denotes a member for supporting a cap member 5022 to cap a front surface of the recording head IJH and 5015 a sucking device to suck the air in the cap. The sucking device executes a sucking recovery of the recording head through an opening 5023 in the cap. Reference numeral 5017 denotes a cleaning blade and 5019 indicates a member for enabling the blade to be moved in the front/rear directions. The cleaning blade 5017 and member 5019 are supported to a main body supporting plate 5018. The blade is not limited to a form shown in the diagram but a well-known cleaning blade can be also obviously applied to the embodiment. Reference numeral 5021 denotes a lever to start the sucking of the sucking recovery. The lever 5021 moves in association with the movement of a cam 5020 which is come into engagement with the carriage. A driving force from the driving motor is transferred by a well-known transfer mechanism such as a clutch switch or the like.

The capping, cleaning, and sucking recovery are constructed in a manner such that when the carriage reaches the area on the home position side, a desired process can be performed at their corresponding positions by the operation of the lead screw 5005. However, if a desired operation is performed at a well-known timing, any one of the above constructions can be applied to the embodiment.

In the system constructed as mentioned above, when the user who uses the host 3000 supplies print information such as various character train information, image information, and the like, a print command, and the like to the printer 1500 through the bidirectional I/F, the printer 1500 generates corresponding print information or the like in accordance with those information and forms an image onto the recording medium such as a recording paper.

Figure 6:
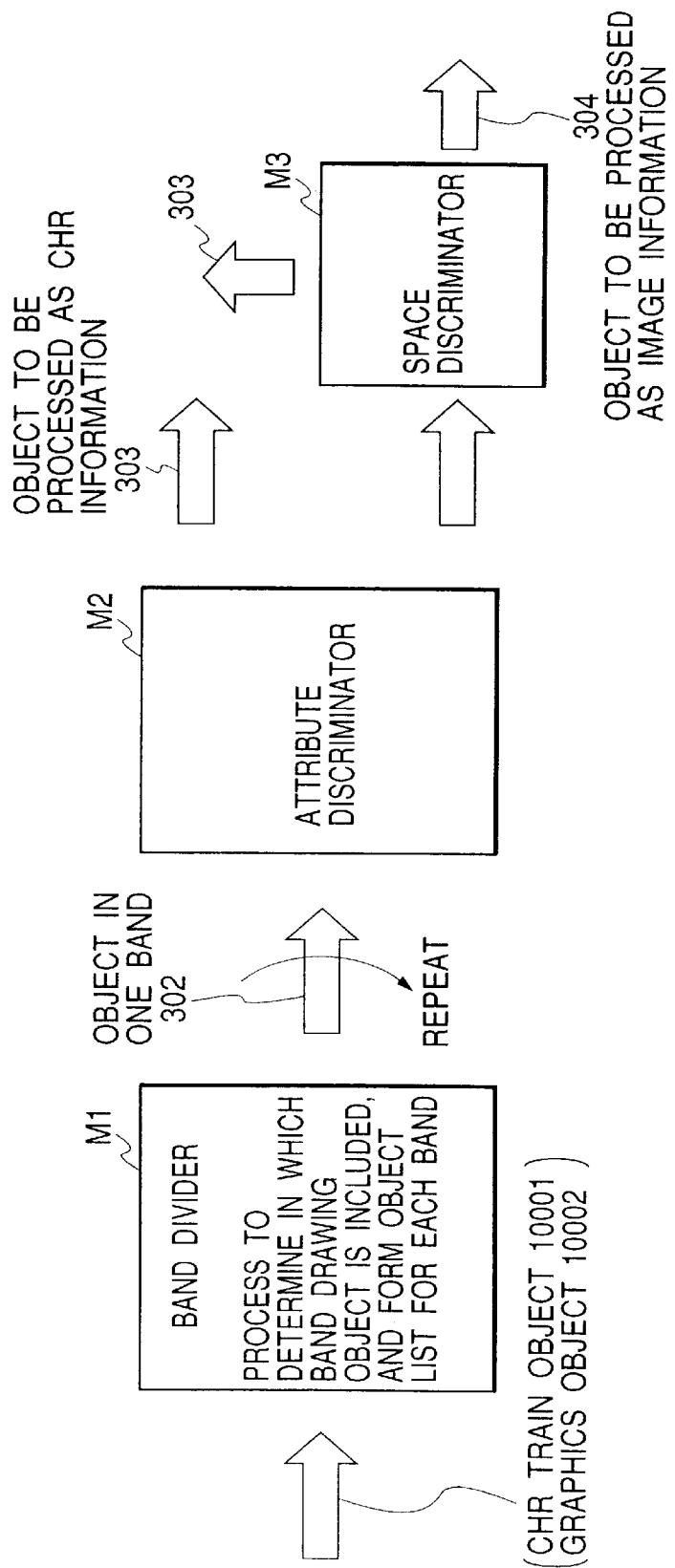
FIG. 6 is a diagram showing a construction of a character train separator.

A detailed block diagram of the character train separator 400 shown in FIG. 6 will now be more specifically explained hereinbelow.

(1) Band divider M1

Figure 7:
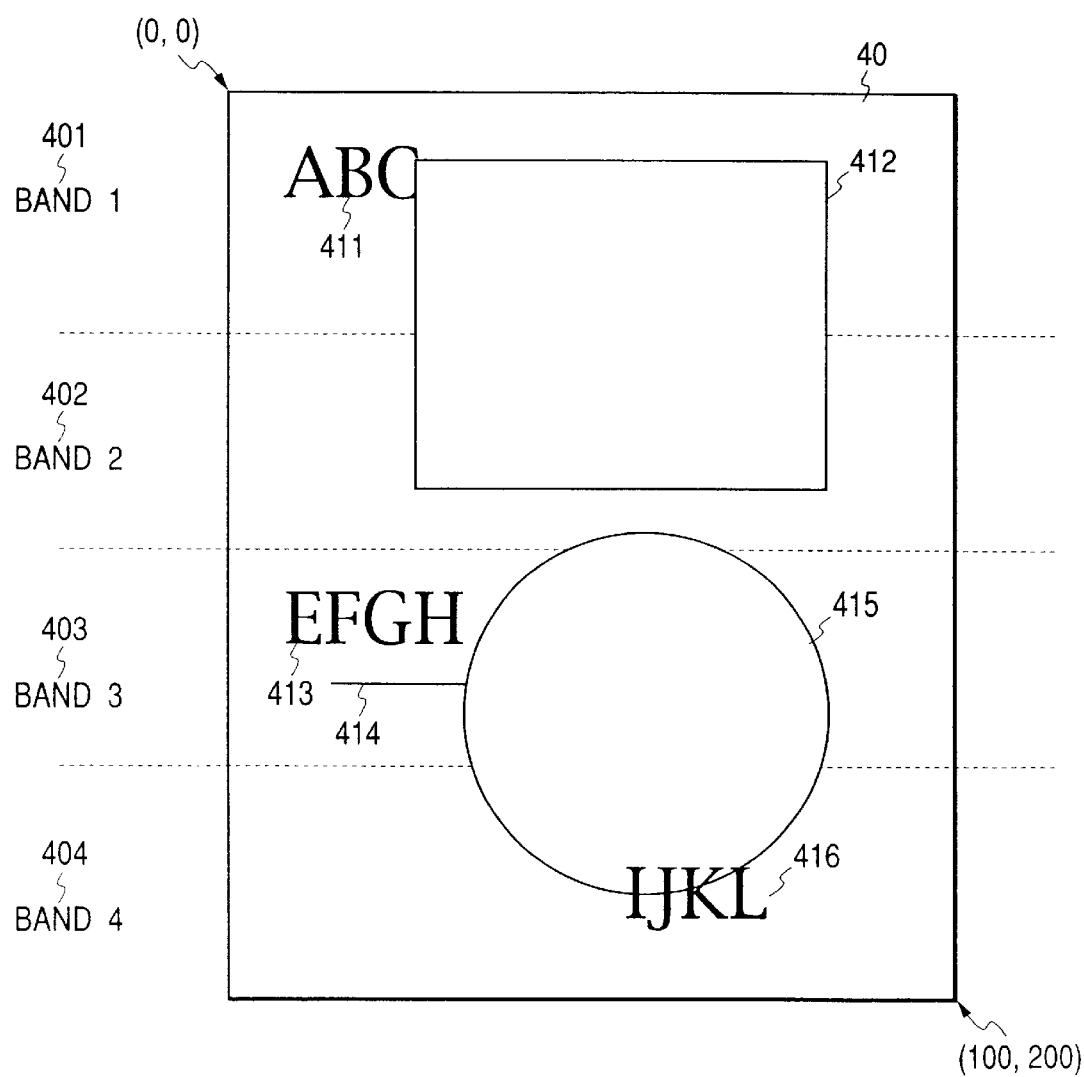
FIG. 7 is a diagram showing a processing concept of a band division.

FIG. 7 shows an example in which one page is divided into four lateral bands 401 to 404. Three character train objects "ABCD" 411, "EFGH" 413, and "IJKL" 416 and three graphics object rectangle fills (painting) 412, an oval 415, and a line segment 414 are included in this page. Among them, a rectangle fill object is drawn on the character train object "ABCD" and a part thereof is hidden.

Figure 8:
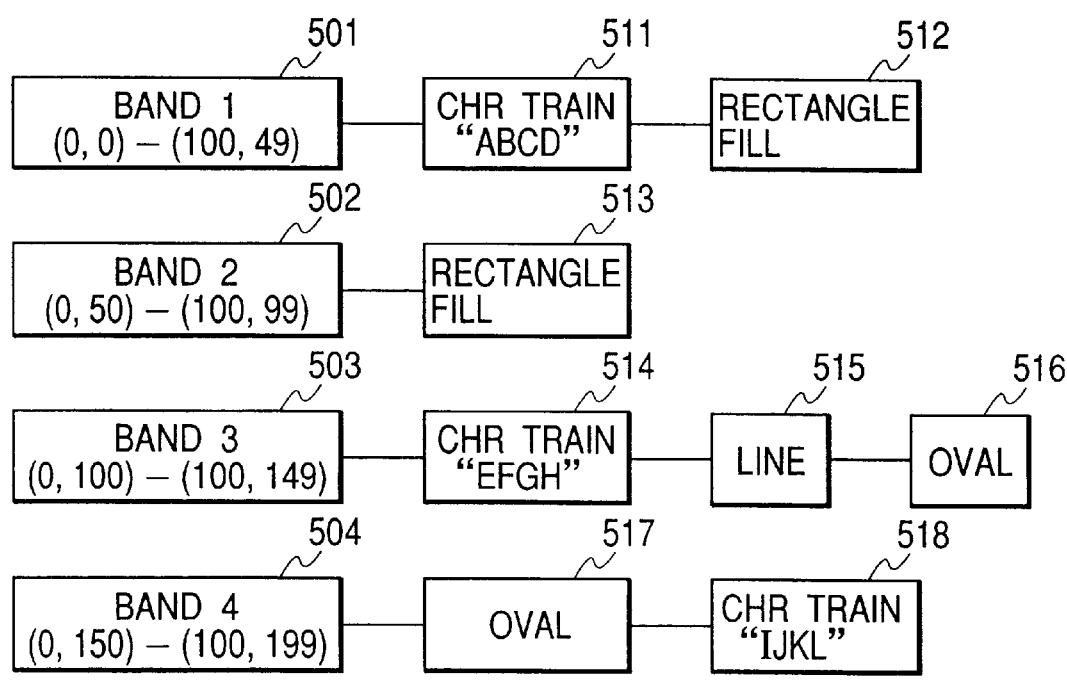
FIG. 8 is a diagram showing an example of a band list.

The band divider M1 processes a set of drawing objects in FIG. 7 and forms band lists of the drawing objects as shown in FIG. 8. The "band list" is a list of information of the drawing object whose region overlays on each band of one page. Band lists 501 to 504 correspond to the band regions 401 to 404, respectively. As for a corresponding relation between the band lists and the band regions, the band list and the band region in which the number of lower one digit of each of the reference numerals in FIGS. 7 and 8 is the same number correspond to each other. Information (in this example, the upper left coordinates and the lower right coordinates of a rectangle forming the band) of each band region is made concerned with each other in the band lists 501 to 504. An overlap of the information of the band region and the region information of each drawing object is discriminated. When they are overlapped, a linking to the drawing object is performed to the end of the band list. For example, after the character train "ABCD" 411 was drawn, a rectangle fill 513 is drawn in the band 401 in FIG. 4. Therefore, the character train "ABCD" 511 and rectangle fill 512 are linked in the band list 501 corresponding to the band 401 from the head in accordance with the drawing order. Such processes are executed for each band until the drawing objects of one page do not exist.

Figure 9:
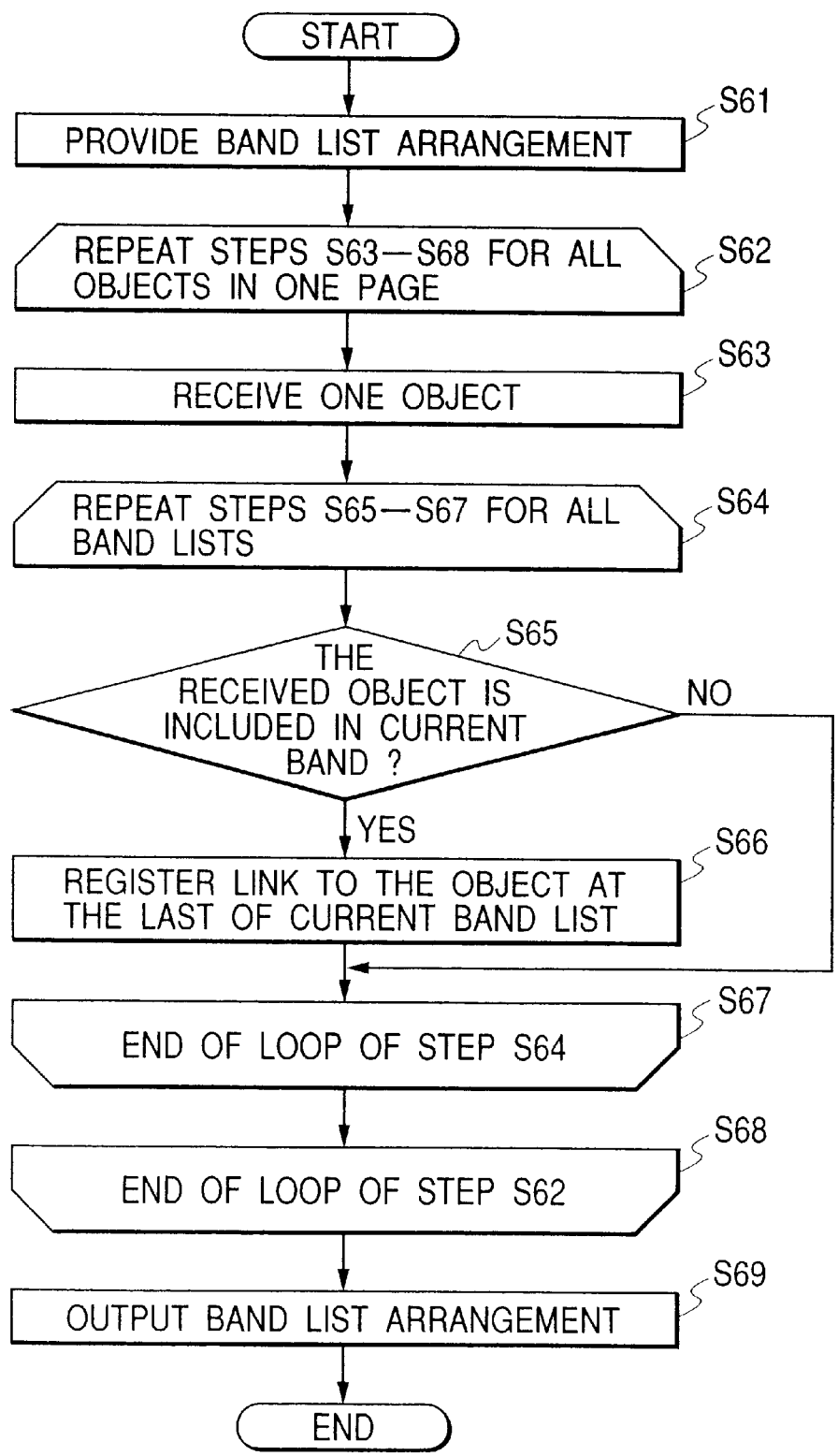
FIG. 9 is a processing flowchart in a band divider.

FIG. 9 shows a flowchart for the band dividing process. The details of the process in each step in FIG. 9 are as follows.

Step S61

An arrangement of the band lists (band lists 501 to 504 in FIG. 8) is prepared and a size of region of each band is stored into the arrangement by a form of upper left coordinates and lower right coordinates.

Step S62

Processes in steps S63 to S68 are repeated until the drawing objects of one page do not exist.

Step S63

One of the inputted drawing objects is received.

Step S64

The processes in steps S65 to S67 are repeated for each element of the arrangement of the band lists.

Step S65

Whether the inputted drawing objects are included in the present band or not is discriminated.

Step S66

When it is determined in step S65 that the drawing objects are included, a link to the drawing objects is registered to the end of the present band list.

Step S67

Indicates the termination of a loop in step S64. That is, the processes in steps S65 and S66 are repeated with respect to all of the band lists.

Step S68

Indicates the termination of a loop in step S62. That is, the processes in steps S63 to S67 are repeated with respect to all of the drawing objects included in one page.

Step S69

An arrangement of the band lists is outputted.

By the above procedure, one page is divided into the bands and a list of the drawing objects in which even a part of them are included in each band can be formed in accordance with the drawing order.

(2) Attribute Discriminator M2

When the band list is formed by the above processes, on the basis of the band list, the drawing order and the overlap of the drawing objects are discriminated every band by the attribute discriminator M2.

Figure 10A:
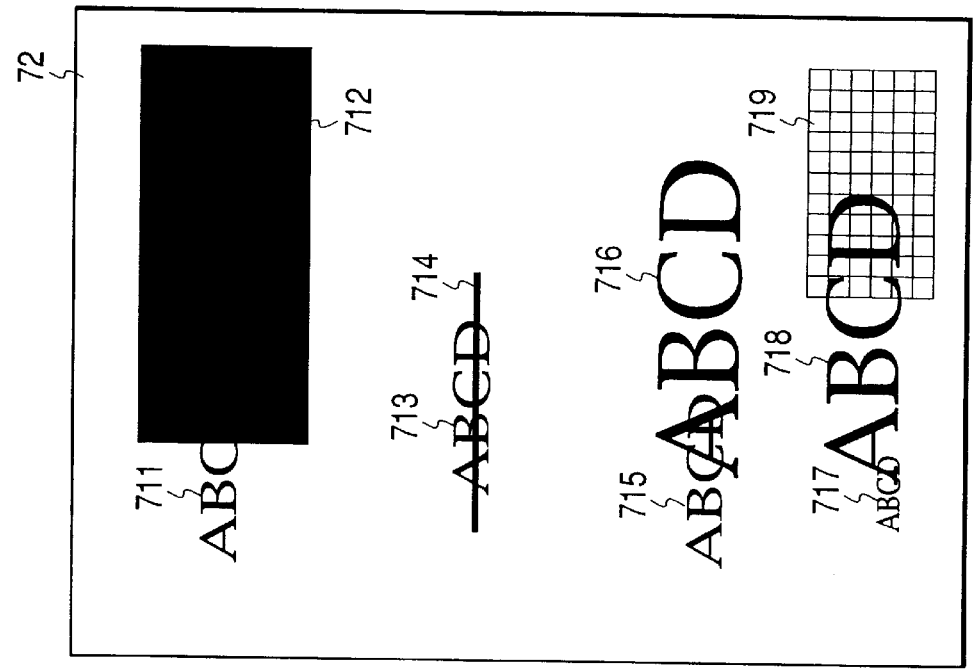
FIGS. 10A and 10B are diagrams showing examples in the case where an overlap of character trains and figures has to be considered and the case where there is no need to consider such an overlap.
Figure 10B:
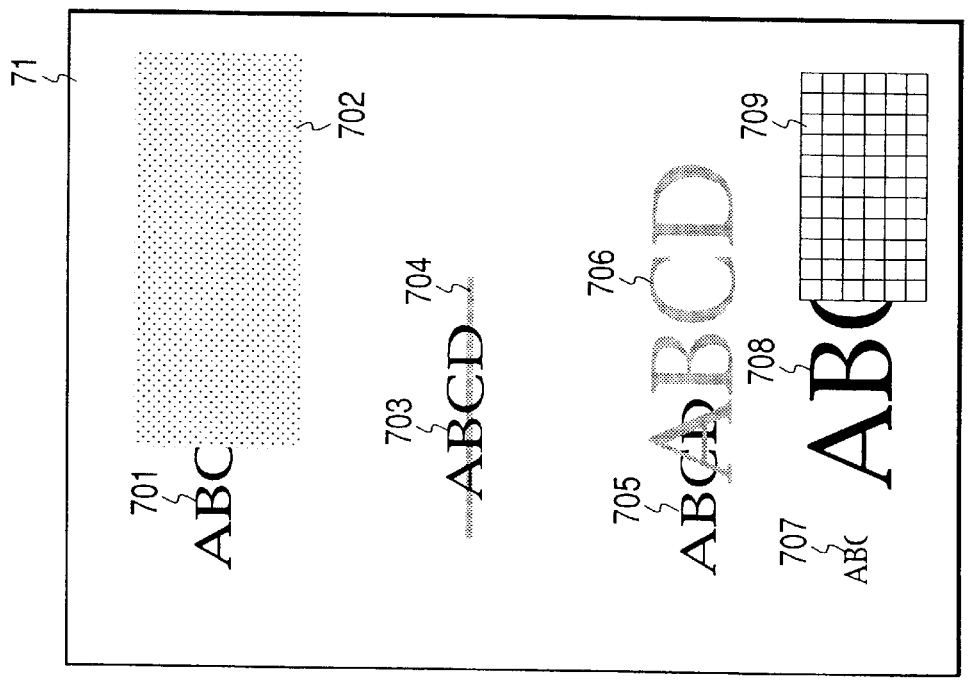

FIGS. 10A and 10B are diagrams showing examples in the case where the overlap of character trains and figures has to be considered and the case where there is no need to consider such an overlap. Although FIGS. 10A and 10B are diagrams shown by black and white monochromatic gradations, the following expressions such as "same color", "different color", and the like are cited with respect to the relation for the colors defined for the printing system. In FIGS. 10A and 10B, reference numerals 71 and 72 denote recording papers (although the color of the paper becomes the background color, it is assumed that the color is transparent in this case). FIG. 10A shows the example in the case where the overlap of the character trains and the figures has to be considered. FIG. 10B shows the example in the case where there is no need to consider the overlap of the character trains and the figures. Each of the examples will now be described in detail hereinbelow.

(i) Example of FIG. 10A in which the overlap of the character trains and the figures has to be considered Case where a character train 701 and a painted rectangle 702 are expressed by different colors and their drawing objects are drawn by overwriting (Example: a1).

Case where a character train 703 and a line segment 704 are expressed by different colors and their drawing objects are drawn by overwriting (Example: a2).

Case where a character train 705 and a character train 706 are expressed by different colors and their drawing objects are drawn by overwriting (Example: a3).

Case where a part of a character train 707 is drawn under a region of a background color (color of a region which is defined behind the character train in order to emphasize the color of characters or to allow the characters to be easily distinguished) of a character train 708 (Example: a4).

Case where a part of the character train 708 is overwritten in a bit pattern 709 whose background color is not transparent (Example: a5).

(ii) Example of FIG. 10B in the case where there is no need to consider the overlap of the character trains and the figures Case where a character train 711 and a painted rectangle 712 are expressed by the same color and their drawing objects are drawn by overwriting or the OR (Example: b1).

Case where a character train 713 and a line segment 714 are expressed by the same color and their drawing objects are drawn by overwriting or the OR (Example: b2).

Case where a character train 715 and a character train 716 are expressed by the same color and their drawing objects are drawn by overwriting or the OR (Example: b3).

Case where the background colors of both of a character train 717 and a character train 718 are transparent (Example: b4).

Case where the character train 718 and a bit pattern 719 are drawn by the OR or the character train 718 and the bit pattern 719 whose background color is transparent are overwritten (Example: b5).

Figure 11:
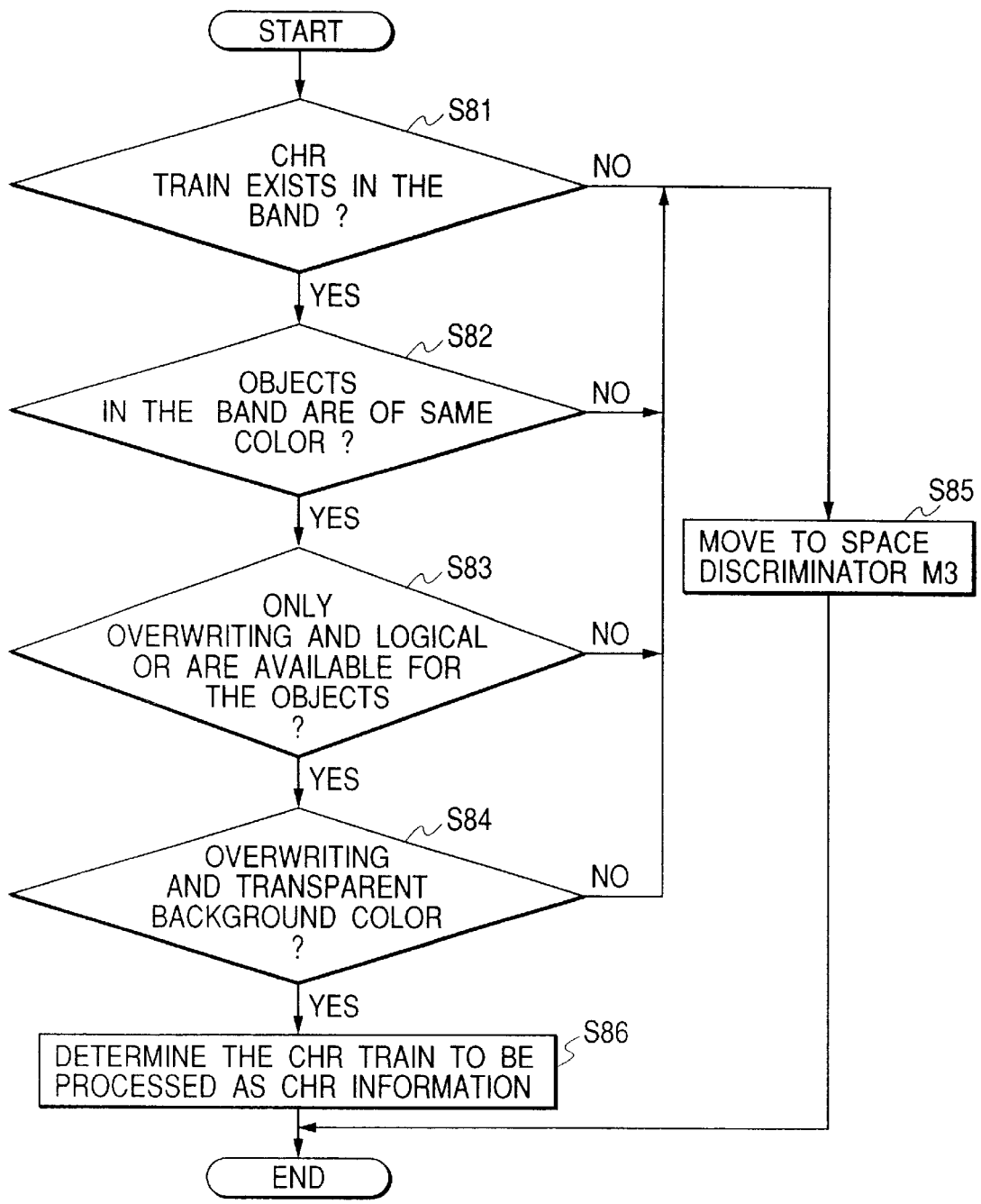
FIG. 11 is a flowchart showing processes of an attribute discriminator to discriminate whether the overlap of character trains and figures has to be considered or not.

The attribute discriminator M2 actually discriminates in accordance with a flowchart shown in FIG. 11 in order to discriminate the example where the overlap of the character trains and the figures has to be considered and the example where there is no need to consider such an overlap as mentioned above. The discriminating process will now be described in detail hereinbelow with reference to FIG. 11.

First in step S81, a check is made to see if the character train exists in the band region. When no character train exists, the processing routine advances to step S85 and the process is shifted to a space discriminator M3. After that, the processing routine is finished. On the other hand, when the character train exists in the region, step S82 follows.

In step S82, a check is made to see if the drawing objects existing in the region are the same color. In consideration of the cases of Examples a1, a2, and a3 described in FIGS. 10A and 10B, in the case where the drawing objects of different colors exist, the processing routine advances to step S85. When the drawing objects are the same color, step S83 follows.

Further in step S83, for example, a check is made to see if there is a special drawing method such that the AND of two drawing objects is calculated and the drawing is performed or the like. In other words, a check is made to see if any special drawing other than the overwriting or the OR arithmetic operation is performed. When it is decided that there is the special drawing method, the processing routine advances to step S85. When it is determined that the drawing method is performed on the basis of only the overwriting or the OR arithmetic operation, step S84 follows.

In step S84, a check is made to see if the drawing is performed by the overwriting and the background color of the characters or bit pattern is transparent. In consideration of the cases of Examples a4 and a5 described in FIGS. 10A and 10B, when the background color is not transparent, step S85 follows. When the background color is transparent, the processing routine advances to step S86 and it is determined that the character train objects in the region are processed as character train information.

On the basis of the discrimination results, the discriminating module M2 finally determines whether character train objects in the region are set to drawing objects 303 which are processed as character train information or the process is shifted to the space discriminator M3.

(3) Space Discriminator M3

Figure 12:
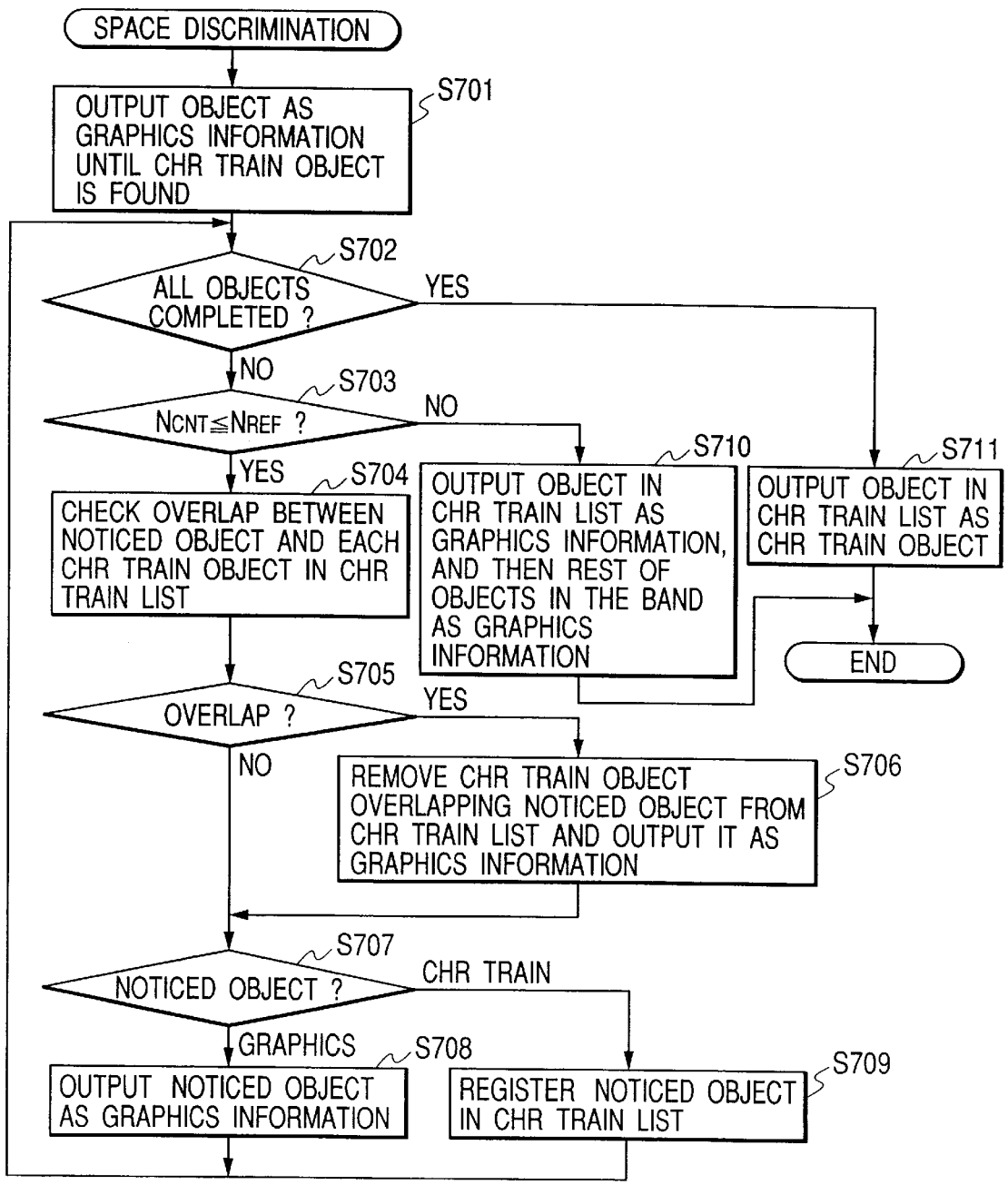
FIG. 12 is a processing flowchart in a space discriminator.

When the drawing objects as many as one band which are processed as image information from the attribute discriminator M2 are inputted, the character train objects to be processed as character train information and the graphics information to be processed as image information are outputted, respectively. The drawing objects to be processed as image information are now defined as graphics information. FIG. 12 shows a flowchart for the space discriminator M3 of the character train. The details of the process in each step will now be described hereinbelow.

Step S701

The drawing object information is sequentially examined until the character train object is found in accordance with the order from the head of the inputted band lists. If it is not the character train object, it is outputted as graphics information. This process is repeated until the character train object is found. The found character train object is registered into the character train list. The character train list is a list of candidates of the character train objects which are outputted as character train information and has a construction similar to FIG. 8 except for a point that no graphics object is included.

Step S702

Discriminating process to form a loop in order to process all of the drawing objects. If all of the drawing objects were processed, the processing routine is branched to step S711. If NO, step S703 follows.

Step S703

The number $N_{cnt}$ of times of overlap discrimination of the objects which were performed so far is counted by adding "1" each time the processing routine executes this step. If a count value is equal to or less than a predetermined reference value $N_{ref}$, step S704 follows. If the count value exceeds the limited number of times, step S710 follows.

Step S704

The next drawing object is read out as a target object from the band list and the overlap of the regions of each of the character train objects registered in the character train list and the target drawing object is discriminated.

Step S705

If the character train object whose region is overlapped exists in the character train list in step S704, the processing routine advances to step S706. If they are not overlapped at all, step S707 follows.

Step S706

The character train objects which are overlapped to the target object are removed from the character train list and those character train objects are outputted as graphics information.

Step S707

The kind of target object is discriminated. In case of the graphics object, step S708 follows. In case of the character train object, step S709 follows.

Step S708

The target object is outputted as graphics information.

Step S709

The target object is registered into the character train list.

Step S710

Since the number $N_{cnt}$ of times of overlap discrimination with the character train objects exceeds the reference value $N_{ref}$, the drawing objects of the character train list are outputted as a graphics information. After that, the rest of the drawing objects are outputted as graphics information. This is because the character train objects in the character train list are the drawing objects to be drawn earlier than the unprocessed drawing objects in the band list as a drawing order. The outputting order has an important meaning.

Step S711

Since it is determined that the character train object registered in the character train list is the character train object which does not overlap within the reference value of the overlap discrimination, the character train object in the character train list is outputted.

According to the embodiment, prior to discriminating the overlap of the objects, whether the object is an object in which there is no need to consider the drawing order or not is discriminated by the discrimination of the attribute. This is because it is necessary to perform the discrimination of the number of times on the order of a factorial of the number of objects in order to discriminate the overlap.

In the host computer of the above construction, by executing the program of FIG. 13, the printing system of the construction of FIG. 1 can be realized. The procedure of FIG. 13 is included in what is called a printer driver and the image of one page is outputted. It is sufficient to repeat the above processes the number of times corresponding to the number of pages in order to output a plurality of pages. Among them, the procedures of FIGS. 9, 11, and 12 are realized as programs.

In FIG. 13, the drawing objects included in the image of one page are first sequentially inputted in step S101. In step S102, band lists are formed in accordance with the procedure of FIG. 9 from the drawing objects inputted in step S101. When the band lists are formed, attention is sequentially paid from the head band list (step S103) and the character train objects in which there is no need to consider the overlap and the objects in which it is necessary to consider the overlap are separated by the procedures of FIGS. 11 and 12. The separated objects, namely, the objects generated in FIGS. 11 and 12 are once stored into a hard disk device or the like and, when the objects as much as one page are fully stored, the processing routine advances to the next step (step S105).

In step S106, the separated character train objects of one page are converted into the character train information. The character train information is transmitted to the printer in step S107. In step S108, the other separated objects are converted into the image information. The character train objects on which the other objects overlap are also included in the other images. They are developed by using the font file stored in the hard disk or the like. The objects are sequentially developed into images in accordance with the overlapping order.

The formed image information is transmitted to the printer.

The objects of one page are transmitted to the printer in accordance with the above procedures. Since the character train objects are transmitted to the printer prior to the other objects, the character train objects can be developed in parallel with the making of the image information in the host computer.

In FIG. 14, the character train information or image information is formed from each drawing object in a lump on a page unit basis. However, the process in step S105 is shifted just after step S109 and the conversion and transmission of the information can be also performed on a band unit basis. By using this method, the printer can sequentially print and output the formed bands. Therefore, the time until the start of the printing can be reduced and the memory capacity that is necessary to form the image can be also decreased.

(Other Embodiments)

The invention can be applied to a system constructed by a plurality of equipment (for instance, a host computer, interface equipment, a reader, a printer, and the like) or can be also applied to an apparatus (for example, a copying apparatus, a facsimile apparatus, or the like) comprising one equipment.

Another object of the invention can be also accomplished by a method whereby a storage medium in which program codes of software to realize the function of the foregoing embodiment have been recorded is supplied to a system or an apparatus and a computer (or a CPU or an MPU) of the system or apparatus reads out and executes the program codes stored in the storage medium.

In this case, the program codes themselves read out from the storage medium realize the function of the foregoing embodiment. The storage medium in which the program codes have been stored constructs the invention.

As a storage medium to supply the program codes, for example, it is possible to use a floppy disk, a hard disk, an optical disk, a magnetooptic disk, a CD-ROM, a CD-R, a magnetic tape, a non-volatile memory card, an ROM, or the like.

Not only a case where the function of the foregoing embodiment is realized by executing the read-out program codes by the computer but also a case where the OS (Operating System) or the like which operates on the computer executes a part or all of the actual processes on the basis of an instruction of the program codes and the function of the foregoing embodiment is realized by the processes is incorporated.

Further, there is also incorporated a case where the program codes read out from the storage medium are written into a memory provided for a function expanding board inserted in the computer or a function expanding unit connected to the computer and, after that, on the basis of an instruction of the program codes, the CPU or the like provided for the function expanding board or function expanding unit executes a part or all of the actual processes, and the function of the foregoing embodiment is realized by the processes.

According to the invention as described above, the following effects are obtained.

(1) It is possible to print by the printer by the designated drawing result.

(2) The attributes and the overlap of the character train objects and the other objects such as graphics or the like are discriminated. The character train objects in which there is no need to consider the overlap are transmitted as character train information to the printer, thereby reducing an amount of data to be transmitted. By developing the image in parallel with the printer, the processing efficiency is improved, the overlap degree of the drawing objects is preserved, and the drawing objects can be outputted as an inherent image formed from the printer.

(3) Since the reference time and the limited number of times are provided for discrimination of the overlap, a situation such that long time is consumed for discrimination can be prevented.

(4) Further, since it is sufficient to perform the processes in the printer in a manner similar to the conventional manner, the above advantages can be obtained by merely changing the image processing apparatus side.

What is claimed is:

1. A character processing apparatus connectable to a printer which develops character train information into bit map data using font information, develops image information into bit map data, and prints the bit map data, said character processing apparatus comprising:

a first discriminator unit for performing a discrimination process comprising discriminating whether a region of a character object has an overlap with that of another object;

a conversion unit for converting the character object into image information using font information if said first discriminator unit discriminates that the region of the character object has an overlap with that of another object, and for converting the character object into character train information including a character code and a print position if said first discriminator unit discriminates that the region of the character object has no overlap with that of another object; and a transmission unit for transmitting the one of the image information and the character train information converted from the character object by said conversion unit to the printer.

2. An apparatus according to claim 1, further comprising a second discriminator unit for discriminating whether said first discriminator unit has performed the discrimination process a predetermined number of times, wherein said conversion unit converts the character object into image information using font information if said second discriminator unit discriminates that said first discriminator has performed the discrimination process the predetermined number of times.

3. An apparatus according to claim 1, wherein if said first discriminator unit discriminates that the region of the character object has an overlap with that of another object, said conversion unit converts the character object into image information based on the other object.

4. An apparatus according to claim 1, wherein the other object is another character object.

5. An apparatus according to claim 1, wherein the printer performs a printing process based on an image developed from the received character train information and the received image information.

6. An apparatus according to claim 1, further comprising a third discriminator unit for discriminating whether an overlap of the region of the character object with that of another object should be taken into consideration, wherein said first discriminator unit performs the discrimination process if said third discriminator unit discriminates that the overlap should be taken into consideration.

7. An apparatus according to claim 6, wherein said third discriminator unit discriminates that the overlap should be taken into consideration if a color specified in the character object differs from that of the other object.

8. An apparatus according to claim 6, wherein said third discriminator unit discriminates that the overlap should be taken into consideration for a drawing operation other than an overwriting and logical OR operation.

9. An apparatus according to claim 6, wherein said third discriminator unit discriminates that the overlap should be taken into consideration for a drawing operation other than an overwriting and transparent background color operation.

10. A character processing method carried out in a host apparatus connectable to a printer which develops character train information into bit map data using font information, develops image information into bit map data, and prints the bit map data, said method comprising:

performing a first discrimination process comprising discriminating whether a region of a character object has an overlap with that of another object;

converting the character object into image information using font information if said first discrimination process discriminates that the region of the character object has an overlap with that of another object, and converting the character object into character train information including a character code and a print position if said first discrimination process discriminates that the region of the character object has no overlap with that of another object; and transmitting the one of the image information and the character train information converted from the character object in said conversion step to the printer.

11. A method according to claim 10, further comprising a second discrimination process of discriminating whether said first discrimination process has performed the discrimination process a predetermined number of times, wherein said conversion step converts the character object into image information using font information if said second discrimination process discriminates that said first discrimination process performed the discrimination process the predetermined number of times.

12. A method according to claim 10, wherein if said first discrimination process discriminates that the region of the character object has an overlap with that of another object, said conversion step converts the character object into image information based on the other object.

13. A method according to claim 10, wherein the other object is another character object.

14. A method according to claim 10, wherein the printer performs a printing process based on an image developed from the received character train information and the received image information.

15. A method according to claim 10, further comprising a third discrimination process for discriminating whether an overlap of the region of the character object with that of another object should be taken into consideration, wherein said first discrimination process performs the discrimination process if said third discrimination process discriminates that the overlap should be taken into consideration.

16. A method according to claim 15, wherein said third discrimination process discriminates that the overlap should be taken into consideration if a color specified in the character object differs from that of the other object.

17. A method according to claim 15, wherein said third discrimination process discriminates that the overlap should be taken into consideration for a drawing operation other than an overwriting and logical OR operation.

18. A method according to claim 15, wherein said third discrimination process discriminates that the overlap should be taken into consideration for a drawing operation other than an overwriting and transparent background color operation.

19. A computer-readable memory medium storing computer-executable process steps for character processing carried out in a host apparatus connectable to a printer which develops character train information into bit map data using font information, develops image information into bit map data, and prints the bit map data, said process steps comprising:

a first discrimination process comprising discriminating whether a region of a character object has an overlap with that of another object;

a conversion process to convert the character object into image information using font information if said first discrimination process discriminates that the region of the character object has an overlap with that of another object, and to convert the character object into character train information including a character code and a print position if said first discrimination process discriminates that the region of the character object has no overlap with that of another object; and a transmission process to transmit the one of the image information and the character train information converted from the character object in said conversion process to the printer.

20. A computer-readable memory according to claim 19, further comprising a second discrimination process to discriminate whether said first discrimination process has performed the discrimination process a predetermined number of times, wherein said conversion process converts the character object into image information using font information if said second discrimination process discriminates that said first discrimination process has performed the discrimination process the predetermined number of times.

21. A computer-readable memory according to claim 19, wherein if said first discrimination process discriminates that the region of the character object has an overlap with that of another object, said conversion process converts the character object into image information based on the other object.

22. A computer-readable memory according to claim 19, wherein the other object is another character object.

23. A computer-readable memory according to claim 19, wherein the printer performs a printing process based on an image developed from the received character train information and the received image information.

24. A computer-readable memory according to claim 19, further comprising a third discrimination process to discriminate whether an overlap of the region of the character object with that of another object should be taken into consideration, wherein said first discrimination process performs the discrimination process if said third discrimination process discriminates that the overlap should be taken into consideration.

25. A computer-readable memory according to claim 24, wherein said third discrimination process discriminates that the overlap should be taken into consideration if a color specified in the character object differs from that of the other object.

26. A computer-readable memory according to claim 24, wherein said third discrimination process discriminates that the overlap should be taken into consideration for a drawing operation other than an overwriting and logical OR operation.

27. A computer-readable memory according to claim 24, wherein said third discrimination process discriminates that the overlap should be taken into consideration for a drawing operation other than an overwriting and transparent background color operation.

28. Computer-executable process steps for character processing carried out in a host apparatus connectable to a printer which develops character train information into bit map data using font information, develops image information into bit map data, and prints the bit map data, said process steps comprising:

performing a first discrimination process comprising discriminating whether a region of a character object has an overlap with that of another object;

converting the character object into image information using font information if said first discrimination process discriminates that the region of the character object has an overlap with that of another object, and converting the character object into character train information including a character code and a print position if said first discrimination process discriminates that the region of the character object has no overlap with that of another object; and transmitting the one of the image information or the character train information converted from the character object in said conversion step to the printer.

29. Computer-executable process steps according to claim 28, further comprising a second discrimination process of discriminating whether said first discrimination process has performed the discrimination process a predetermined number of times, wherein said conversion step converts the character object into image information using font information if said second discrimination process discriminates that said first discrimination process performed the discrimination process the predetermined number of times.

30. Computer-executable process steps according to claim 28, wherein if said first discrimination process discriminates that the region of the character object has an overlap with that of another object, said conversion step converts the character object into image information based on the other object.

31. Computer-executable process steps according to claim 28, wherein the other object is another character object.

32. Computer-executable process steps according to claim 28, wherein the printer performs a printing process based on an image developed from the received character train information and the received image information.

33. Computer-executable process steps according to claim 28, further comprising a third discrimination process for discriminating whether an overlap of the region of the character object with that of another object should be taken into consideration, wherein said first discrimination process performs the discrimination process if said third discrimination process discriminates that the overlap should be taken into consideration.

34. Computer-executable process steps according to claim 33, wherein said third discrimination process discriminates that the overlap should be taken into consideration if a color specified in the character object differs from that of the other object.

35. Computer-executable process steps according to claim 33, wherein said third discrimination process discriminates that the overlap should be taken into consideration for a drawing operation other than an overwriting and logical OR operation.

36. Computer-executable process steps according to claim 33, wherein said third discrimination process discriminates that the overlap should be taken into consideration for a drawing operation other than an overwriting and transparent background color operation.

* * * * *

UNITED STATES PATENT AND TRADEMARK OFFICE
CERTIFICATE OF CORRECTION

PATENT NO.   : 6,504,955 B2
DATED        : January 7, 2003
INVENTOR(S)  : Hiroshi Oomura et al.

It is certified that error appears in the above-identified patent and that said Letters Patent is hereby corrected as shown below:

<u>Column 15,</u>
Line 20, "discriminator" should read -- discriminator unit --.

<u>Column 18,</u>
Line 8, "or" should read -- and --.

Signed and Sealed this

Seventh Day of October, 2003

JAMES E. ROGAN
*Director of the United States Patent and Trademark Office*